United States Patent Office 3,449,497
Patented June 10, 1969

3,449,497
METHODS OF COMBATTING NEMATODES
Martin Jacob Handele and Johannes Kuipers, Weesp, and Kobus Wellinga, Eindhoven, Netherlands, assignors, by mesne assignments, to U.S. Philips Corporation, New York, N.Y., a corporation of Delaware
No Drawing. Filed Aug. 11, 1967, Ser. No. 659,856
Claims priority, application Netherlands, Aug. 13, 1966, 6611424
Int. Cl. A01n 9/22, 17/08
U.S. Cl. 424—263                                6 Claims

ABSTRACT OF THE DISCLOSURE

Use of 3 methyl or 3,5-dimethyl 4-halo pyridine or pyridine N-oxides as soil nematocides. An example is 4-chloro-3-methylpyridine N-oxide. This abstract is not intended to be a description of the invention defined by the claims.

This invention relates to novel nematocidal compositions and to methods of employing said nematocidal compositions in combatting soil dwelling nematodes.

According to the invention it has been found that halogenated pyridines of the following formula have excellent nematocidal activities particularly against nematodes occurring in the soil:

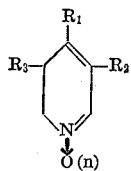

wherein $R_1$ is chlorine or bromine, $R_2$ is hydrogen or alkyl of 1-4 carbon atoms particularly methyl, $R_3$ is alkyl of 1-4 carbon atoms particularly methyl and $n$ is 0 or 1.

Examples of these compounds are:
(1) 4-chloro-3-methylpyridine hydrochloride.
(2) 4-chloro-3-methylpyridine-N-oxide.
(3) 4-chloro-3,5-dimethylpyridine hydrochloride.
(4) 4-chloro-3,5-dimethylpyridine-N-oxide.

These compounds are known with the exception of 4-chloro-3,5-dimethyl-pyridine hydrochloride.

Applicants have found that the compounds according to the invention are active against plant parasitic nematodes and that by means of compositions prepared on the basis of these compounds, the nematode populations occurring in the soil can be inactivated so that they cause little or no damage to the plant crops.

The compounds have proved particularly active against non-free-living nematodes for example Meloidogyne species. The control of Meloidogyne-nematodes is of particular importance because the organisms of this species cause damage to a very large number of host plants among which are: cotton, tobacco, red pepper, tomato, flowers, fruit trees (notably lemon and grapefruit), tea, hemp, soya-bean, sugar beets and olives.

In particular, the 4-chloro-3-methylpyridine hydrochloride has proved to be particularly active.

The compounds of the invention are particularly useful as a preventive means against the occurrence of damage to plants by nematodes.

It therefore is of advantage to treat the soil with the compound before there is planting or sowing in the soil. In most cases a waiting period of from 5 to 14 days is sufficient before planting takes place. In some cases the soil may be treated simultaneously with or after the planting. This is particularly so when the plants were already protected in a different manner to a certain extent against nematode infestation or when the plants are damaged by nematodes only at a later stage of the development.

One of the advantages of the compounds according to the invention is that the substances are only very slightly phytotoxic, both with respect to the above-soil and sub-soil parts of the plants.

The effects according to the invention can be obtained with a comparatively low dosage. Thus concentrations of 5-150 kg./hectare particularly 10-80 kg./hectare formulated in the usual manner are generally effective dosages, that is to say, as a solution of the compound in water, in a mineral oil, possibly mixed with a water-miscible solvent, for example, a lower aliphatic alcohol. In addition, the substance may be processed into granules. Various forms are possible, for example, porous granules (for example, attaclay, pumice), mineral non-porous granules (for example sand, ground marl), organic granules (for example, coffee grounds, stems of tobacco leaves), or granules which can be produced by compression of powdered minerals and/or organic substances. Other possibilities are: invert emulsion, miscible oil, paste, wettable powders, water-soluble powder, dust or aerosols.

The invention will now be described in greater detail with reference to the following examples:

Examples (1) 4-chloro-3-methylpyridine-N-oxide was dissolved in water, to which also an emulsifier was added according to the following formulation:

| | Percent |
|---|---|
| Active substance | 45.0 |
| Emulsifier (alkylaryl) | 1.5 |
| Distilled water (polyglycol ether) | 53.5 |
| | 100.0 |

This solution was applied to the soil at a rate of 40 kg. of active substance per hectare. This formulation gave one of the most homogeneous distribution of the active substance in the soil.

(2) 4-chloro-3-methylpyridine-hydrochloride was dissolved in water and then impregnated on attaclay granules according to the following composition:

| | Percent |
|---|---|
| Active substance | 15.0 |
| Water | 18.3 |
| Attaclay granules, diameter 0.5-2 mms. | 66.7 |
| | 100.0 |

In a dosage of 40 kg. of active substance per hectare, a cover of 4 granules per cm. was obtained.

(3) 4 - chloro - 3-methylpyridine-hydrochloride coated with a thin layer of a fatty alcohol was impregnated into attaclay granules according to the composition:

|   | Percent |
|---|---|
| Active substance | 15.0 |
| Water | 18.3 |
| Attaclay granules, diameter 0.5–2 mms. | 64.2 |
| Fatty alcohols (technical quality) consisting of: 7–10% of myristyl alcohol, 43–45% cetylaldehol and 40–50% of stearyl alcohol | 2.5 |
|   | 100.0 |

In a dosage of 40 kg. of active substance per hectare a cover of approximately 4 parts per cm. was obtained.

(4) 4-chloro-3-methylpyridine-N-oxide was dispersed in water and then impregnated on dry coffee granules as follows:

|   | Percent |
|---|---|
| Active substance | 5.0 |
| Water | 10.0 |
| Dried coffee granules, diameter 0.5–2 mms. | 85.0 |
|   | 100.0 |

In a dosage of 40 kg. per hectare a cover of 12 granules per m.² was obtained.

(5) A wettable powder was prepared having the following composition:

|   | Percent |
|---|---|
| 4-chloro-3,5-dimethylpyridine hydrochloride | 75.0 |
| Mineral or soluble salt, for example, urea | 22.5 |
| Surface active substance | 2.5 |
|   | 100.0 |

(6) Granules were prepared having the following composition:

|   | Percent |
|---|---|
| 4-chloro-3,5-dimethylpyridine-N-oxide | 25.0 |
| Sulphite-lye powder | 10.0 |
| Water | 5.0 |
| Dolomite | 60.0 |
|   | 100.0 |

The compositions of the invention may be introduced into the soil in several different ways.

According to one method, a composition in a finely divided form is brought on the soil which is then dug, harrowed or ploughed. For most purposes, it is sufficient when the soil is cultivated to a depth of from 10 to 50 cm. In rainy periods the mechanical cultivation of the soil may be omitted and it may be left to the influence of the rain to bring the active substance deeper into the soil. As a rule it is not necessary to repeat the whole treatment, but if required, a quantity of from 10 to 80 kgms. of active substance per hectare may again be brought on the soil after a few weeks. It has not been found that in this manner damage of any significance is done to vegetation grown up in the meantime.

According to another method, a composition containing the active substance is provided in the rows of furrows destined for the vegetation to be sown or planted. Although in this manner deactivation of the nematodes over the total surface of the soil is not obtained, a protection against the nematode activity can be obtained in this manner at the places where this is desirable since the nematodes move at a comparatively low rate.

The active compounds according to the invention may also be mixed with other pesticides, notably, soil fungicides, for example, chloropikrine, tetramethyl thiouram disulphide, pentachloronitrobenzene, zineb, maneb, 8-hydroxy-quinoline, organic tin- and mercury compounds, triphenyl tin hydroxide or the acetate or butyrate thereof, in addition monomethyl dithiocarbamic acid sodium salt, in addition with soil insecticides, for example, chlorinated hydrocarbons (dieldrin) endrin, toxaphen and hexachlorocyclohexane) or, finally, with artificial manures for example, phosphates.

(7) 80 gms. of 4-chloro-3-methylpyridine-N-oxide were mixed according to example number 1, with 2.6 gms. of alkylarylpolyglycolether (Triten X 114″) and 96 g. of water. The preparation was diluted with water to 80.1.

Three other solutions were prepared in quite the same manner differing only in the quantity of 4-chloro-3-methyl-pyridine-N-oxide. The quantities were 40, 20 and 0 g. (blank) respectively.

Each solution was evenly sprayed on unplanted plots of 10 ml. each. According to the soil samples, the soil was infested with *Meloidogyne incognita* var. *acrita* (on an average 1500 larvae per 500 g. of soil). The degree of infestation was substantially the same for all the plots. Right after spraying, each plot was cultivated to a depth of 25 cm. 1 week after the soil treatment, young tomato plants (var. Bonny Best), approximately 8 cm. high, were planted on each plot.

10 weeks after planting, the weight of the plants and the degree of root gall formation were determined.

On the plots where a 4-chloro-3-methyl-pyridine-N-oxide containing solution had been sprayed, a considerably smaller root gall formation was found than on the blank plot where the systems of roots were badly infested.

(8) 4-chloro-3-methylpyridine hydrochloride.—Units of 1 kgm. of soil infested with *Meloidopy incognita* var. *acrita*, were mixed with 25, 6¼ and 0 mgs. of 4-chloro-3-methyl-pyridine hydrochloride dissolved in 20 mls. of water. The units of treated soil were then transferred to glass 1-litre pots, sealed and stored for 1 week at a temperature of approximately 22° C. After this period the units of soil were transferred to plastic pouches which, likewise sealed, were stored for 1 week at a temperature of approximately 22° C. These pouches with soil were then dug in a stape (27° C.) and planted with young tomato plants (approximately 8 cms. high). 6 weeks after planting the root infestation was determined. A strong reduction of the root infestation was found with respect to a control experiment.

(9) 6.3 g. (0.04 mol.) of 4-chloro-3,5-dimethyl-N-oxide were dissolved in 50 mls. of chloroform. A solution of 11 g. (0.08 mol) of phosphorus trichloride in 25 ml. of chloroform was added dropwise to the solution while stirring, during which the temperature rose. After the addition, the solution was refluxed for 30 minutes. Gaseous hydrogen chloride was led in the resulting solution to saturation. The chloroform was evaporated in vacuo for the greater part after which the hydrochloride of 4-chloro-3,5 dimethyl pyridine was precipitated by the addition of diethyl ether. Yield 5.3 g. (74.4%) melting-point 232.5° (sublimation).

What we claim is:

1. A method of inactivating plant parasitic nematodes in the soil comprising contacting soil nematodes with a nematocidally effective amount of a halogenated pyridine derivative of the formula:

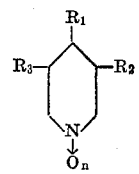

wherein $R_1$ is a member selected from the group consisting of chlorine and bromine, $R_2$ is a member selected from the group consisting of hydrogen and alkyl of 1–4 carbon atoms, $R_3$ is alkyl of 1–4 carbon atoms and $n$ is 0 or 1.

2. The method of claim 1 wherein the halogenated pyridine derivative is employed at the rate of 10–80 kg. per hectare.

3. The method of claim 1 wherein the halogenated pyridine derivative is 4-chloro-3-methylpyridine hydrochloride.

4. The method of claim 1 wherein the halogenated pyridine derivative is 4-chloro-3-methylpyridine-N-oxide.

5. The method of claim 1 wherein the halogenated pyridine derivative is 4-chloro-3,5-dimethylpyridine-hydrochloride.

6. The method of claim 1 wherein the halogenated pyridine derivative is 4-chloro-3,5-dimethylpyridine-N-oxide.

References Cited

UNITED STATES PATENTS

| | | | |
|---|---|---|---|
| 3,044,930 | 7/1962 | Goodhue | 167—46 |
| 3,377,240 | 4/1968 | Nault | 167—33 |

ALBERT T. MEYERS, *Primary Examiner.*

J. GOLDBERG, *Assistant Examiner.*